(12) United States Patent
DeFillipi

(10) Patent No.: US 10,000,049 B2
(45) Date of Patent: Jun. 19, 2018

(54) METHODS AND APPARATUS FOR APPLYING PROTECTIVE FILMS

(71) Applicant: EXEL Industries, Paris (FR)

(72) Inventor: Michael DeFillipi, Plymouth, MI (US)

(73) Assignee: EXEL INDUSTRIES, Paris (FR)

( * ) Notice: Subject to any disclaimer, the term of this patent is extended or adjusted under 35 U.S.C. 154(b) by 95 days.

(21) Appl. No.: 14/311,533

(22) Filed: Jun. 23, 2014

(65) Prior Publication Data
US 2015/0367620 A1   Dec. 24, 2015

(51) Int. Cl.
   B05D 1/40   (2006.01)
   B05C 5/02   (2006.01)
   (Continued)

(52) U.S. Cl.
   CPC .......... B32B 37/153 (2013.01); B05C 5/0216 (2013.01); B05C 5/0254 (2013.01);
   (Continued)

(58) Field of Classification Search
   CPC .............. B32B 37/153; B29C 63/0017; B29C 63/0056; B29C 47/025; B29C 47/0866; B05C 5/0216; B05C 5/0283; B05C 5/0291; B05D 1/26; B05D 1/265; B05D 1/30; B05D 1/305; B05D 1/40; B05D 1/42; B01D 1/265; B65B 33/04; B65B 33/06; B65B 33/00; B65B 33/02
   See application file for complete search history.

(56) References Cited

U.S. PATENT DOCUMENTS 3,259,597 A * 7/1966 Burger .................... C08K 5/00
                                                         524/178
4,753,819 A * 6/1988 Shimada .................. B05B 1/04
                                                         427/207.1
(Continued)

FOREIGN PATENT DOCUMENTS

CA          2289923           7/2004
DE     102010011095 A1 * 10/2010 ............. B05B 1/044
(Continued)

OTHER PUBLICATIONS

Giles, H. F., et al., Extrusion: The Definitive Processing Guide and Handbook, 2005, pp. 46-51.*
(Continued)

*Primary Examiner* — William P Bell
(74) *Attorney, Agent, or Firm* — Young Basile Hanlon & MacFarlane. P.C.

(57) ABSTRACT

An applicator die for creating and applying laminarized ribbons of polymeric film to a target surface, such as but not limited to a surface of an automobile body component. In one embodiment, the protective film is an aqueous emulsion of polyvinyl acetate and is used to create a continuous peelable film to protect a surface. In another embodiment, the polymeric is polyvinyl chloride and it is applied to create an anti-chip coating. The applicator die has an internal supply gallery and an outlet slot of complex shape to emit a laminarized ribbon of polymer-based material that allows the material to be applied directly to the target surface without masking. A robot is used to control movement of the die. The die includes temperature control.

10 Claims, 8 Drawing Sheets

(51) Int. Cl.
  *B32B 37/15* (2006.01)
  *B32B 37/00* (2006.01)
  *B29C 47/02* (2006.01)
  *B05D 1/42* (2006.01)
  *B05D 5/00* (2006.01)
  *B05D 1/26* (2006.01)
  *B05D 1/32* (2006.01)

(52) U.S. Cl.
  CPC .............. *B05C 5/0283* (2013.01); *B05D 1/26* (2013.01); *B05D 1/42* (2013.01); *B05D 5/00* (2013.01); *B29C 47/025* (2013.01); *B32B 37/0046* (2013.01); *B05D 1/325* (2013.01)

(56) References Cited

U.S. PATENT DOCUMENTS

| | | | |
|---|---|---|---|
| 5,010,131 A | 4/1991 | Wagner | |
| 5,143,949 A * | 9/1992 | Grogan | C09D 5/008 427/154 |
| 5,169,900 A | 9/1992 | Gudelis | |
| 5,186,978 A | 2/1993 | Woodhall et al. | |
| 5,212,215 A * | 5/1993 | Nanri | C09D 127/06 523/218 |
| 5,224,967 A | 7/1993 | Rolf et al. | |
| 5,244,957 A * | 9/1993 | Best | C08K 5/42 524/418 |
| 5,275,340 A | 1/1994 | Haruch | |
| 5,281,436 A | 1/1994 | Swidler | |
| 5,300,558 A | 4/1994 | Kurisu et al. | |
| 5,330,795 A | 7/1994 | Batdorf et al. | |
| 5,336,349 A | 8/1994 | Cornils et al. | |
| 5,418,006 A | 5/1995 | Roth et al. | |
| 5,509,969 A | 4/1996 | Grawe | |
| 5,548,017 A | 8/1996 | DiStefano | |
| 5,554,325 A | 9/1996 | Kotte et al. | |
| 5,736,470 A | 4/1998 | Schneberger et al. | |
| 5,824,734 A | 10/1998 | Yang | |
| 6,124,044 A | 9/2000 | Swidler | |
| 6,171,434 B1 * | 1/2001 | Klinger | B05B 15/0475 156/289 |
| 6,773,804 B2 | 8/2004 | Enlow et al. | |
| 6,861,100 B1 | 3/2005 | Schucker | |
| 7,169,841 B2 | 1/2007 | Schwalm et al. | |
| 2002/0127334 A1 | 9/2002 | Gurer et al. | |
| 2003/0155451 A1 * | 8/2003 | Nakamura | B05B 1/044 239/597 |
| 2004/0261701 A1 | 12/2004 | Kobayashi et al. | |
| 2006/0045965 A1 * | 3/2006 | Lin | B05D 5/066 427/162 |
| 2007/0251449 A1 * | 11/2007 | Mizuno | G03F 7/162 118/668 |
| 2009/0104355 A1 * | 4/2009 | Nakazawa | B05C 11/06 427/299 |
| 2010/0167038 A1 * | 7/2010 | Linnenbrink | B29B 13/022 428/220 |
| 2012/0027942 A1 * | 2/2012 | Joos | B05C 5/0254 427/421.1 |
| 2012/0135194 A1 * | 5/2012 | Takeda | B05D 7/54 428/156 |
| 2015/0273496 A1 | 10/2015 | Shinoda et al. | |

FOREIGN PATENT DOCUMENTS

| | | | | |
|---|---|---|---|---|
| EP | 1008632 A2 * | 6/2000 | | C09D 5/4492 |
| GB | 2145640 A | 4/1984 | | |
| WO | 0067915 A1 | 11/2000 | | |

OTHER PUBLICATIONS

Machine translation of German Patent Publication No. DE-1-02010011095A1, originally published Oct. 28, 2010, 8 pages.*

MacMinn, C.W., and G.H. McKinley, "Tubeless Siphon and Die Swell Demonstration", Sep. 26, 2004, available on-line at http://web.mit.edu/nnf/research/phenomena/Demos.pdf, 6 pages.*

"3M Technical Data Sheet for Factory Match Seam Sealer 38323", Jan. 2012, available on-line at http://multimedia.3m.com/mws/media/8320620/38323-3mtm-factory-match-seam-sealer-tech-data-sheet-tds.pdf, 4 pages.*

* cited by examiner

METHODS AND APPARATUS FOR APPLYING PROTECTIVE FILMS

FIELD OF THE INVENTION

Disclosed herein are methods and apparatus for producing and applying polymeric film to the surfaces of an article of manufacture, such as but not limited to an automobile body or a portion thereof, wherein the apparatus includes an applicator configured to hydraulically deliver a laminarized ribbon of polymer-based film with controlled width, thickness and edge characteristics.

BACKGROUND OF THE INVENTION

It is known to protect the painted exterior surfaces of automobiles and parts for automobiles with prefabricated and sprayed-on polymeric films to reduce the likelihood of damage during shipment, storage and use. There have been numerous problems associated with the application of such films. Spraying invokes the need to deal with overspray, both in the air and on parts of the article which are not to be coated. Further, it is often necessary to use solvents to remove the film. Prefabrication involves, first, the extrusion of a thin film of plastic in sheet form and, second, the step of laminating the plastic film to a paper backing so it can be rolled up for shipment or storage. When the time comes to apply the film to, for example, an automobile, several laborers are required to unroll the paper-backed film, lay the film over the automobile, remove the paper backing, and smooth the film. The result is a peelable film requiring no solvents or detergents for removal but the manufacturing and application process is labor intensive and, therefore, involves substantial expense.

It is also known to apply a film or coating of resilient protective polymeric material such as PVC to the rocker panels of automobile bodies thereby to serve as an anti-chip coating. The coating is typically sprayed onto the vehicle rocker panel during the painting phase and dried or cured using, for example, infrared radiation. This sprayed-on method of application requires carefully masking of the body of the vehicle for overspray protection, which is labor-intensive. The masking must also be removed and disposed of, adding further cost to the process.

SUMMARY OF THE INVENTION

In general, this document discloses a manner in which large and small areas of polymer-based film can be applied directly to a component, such as an automobile body component, by the controlled hydraulic emission or "extrusion" of a laminarized ribbon of polymer-based material without atomization and with controlled width, thickness and edge characteristics. This virtually eliminates the problems associated with the prior art spray methods.

A first aspect of the subject matter described herein is an applicator die for producing through a process of laminarized extrusion, a ribbon of fluidized polymeric material in close proximity to a surface to be coated without atomization of the material. The applicator die can be designed and robotically guided to dynamically and consistently lay down a polymeric film of the desired width, length, thickness and edge characteristics in a precise fashion, at low labor cost. Although the examples described herein involve fairly flat surfaces, the applicator can be configured to conform to curved or complex surfaces. The applicator described herein may be said to "hydraulically extrude" laminarized, emulsified polymeric material in a ribbon with well controlled edge-to-edge consistency and thickness. When used to produce a protective layer for an automobile body, the prior art steps of pre-extruding a film and applying the film to a paper backing are eliminated because the robotic arm guiding the applicator can be indexed to produce multiple overlapping ribbons that together cover large uninterrupted areas. Moreover, the applicator hereinafter described in detail can be "ambidextrous" in that it is capable of producing adjacent parallel ribbons of plastic film without indexed rotation for reversal; i.e., the applicator can be reversed in its direction of travel. In addition, the applicator can be used to apply different materials for different purposes to horizontal, vertical and inverted surfaces, whether flat, concave or convex. The resulting film is readily peelable and easily disposed of or recycled.

Another aspect of the subject matter described herein is the use of the applicator die described above to apply a protective film of a polymeric material, such as an aqueous solution of polyvinyl acetate (PVA), to the finished surfaces of an automobile body or component part therefor, which protective coating, after curing, is readily and easily peelable without the use of solvents of detergents. For the reasons described above, this process is highly efficient due in part to the fact that the application of overlapping polymeric ribbons, applied in a back and forth fashion, can be carried out simply by indexing the applicator and without the need to rotate the applicator 180° between parallel runs. The applicator can essentially be moved relative to the application surface at the speed at which the applied material is emitted from the applicator die. Speeds of about 1500 mm/second have been achieved. However, translation speed will vary from application to application.

As further described herein, the applicator die comprises a body with an inlet, a long-narrow, slot-like outlet, and a gallery for distributing material from the inlet to the outlet. The outlet configuration can be determined in substantial part by shim or spacer as shown in the illustrative embodiment. The die creates an hydraulic laminarized ribbon of continuous; i.e., non-atomized, material that diverges briefly after emerging from the slot, and then converges or narrows, thus providing latitude in the usable distance between the applicator outlet and the target surface. Die to target spacing is preferably selected to apply the film at its maximum ribbon width. The die can also be configured to control thickness across the ribbon such that it is thinner or thicker near the outside edges than in the middle. When thinner at the edges, ribbon overlap areas may be no more than about equal to the thickness of the ribbon center, thus equalizing drying or curing times for all parts of the final applied film area. The process requirements may vary from job to job, thus calling for configuration variations using the teachings herein.

Another aspect of the subject matter disclosed herein is the use of the aforementioned applicator die in applying an anti-chip coating to, for example, the rocker panels of an automobile body. In this case, the material being applied can be an undirected; i.e., unatomized, laminar-flowing ribbon of emulsified polyvinyl chloride (PVC). In the preferred embodiment, the PVC ribbon is applied over primer previously applied on the rocker panel but before the application of the base and clear coat. It has been determined that it is not necessary to wait for the PVC ribbon to completely dry before the paint or clear coating is applied; i.e., final coatings can be applied "wet-on-wet," greatly reducing production time and totally eliminating the need for masking and spraying as are required in the prior art techniques.

Other advantages, features and characteristics of the subject matter disclosed herein, as well as methods of operation and functions of the related elements of the structure, and the combination of parts and economies of manufacture, will become more apparent upon consideration of the following detailed description and the appended claims with reference to the accompanying drawings, the latter being briefly described hereinafter.

BRIEF DESCRIPTION OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENTS

Figure 1:
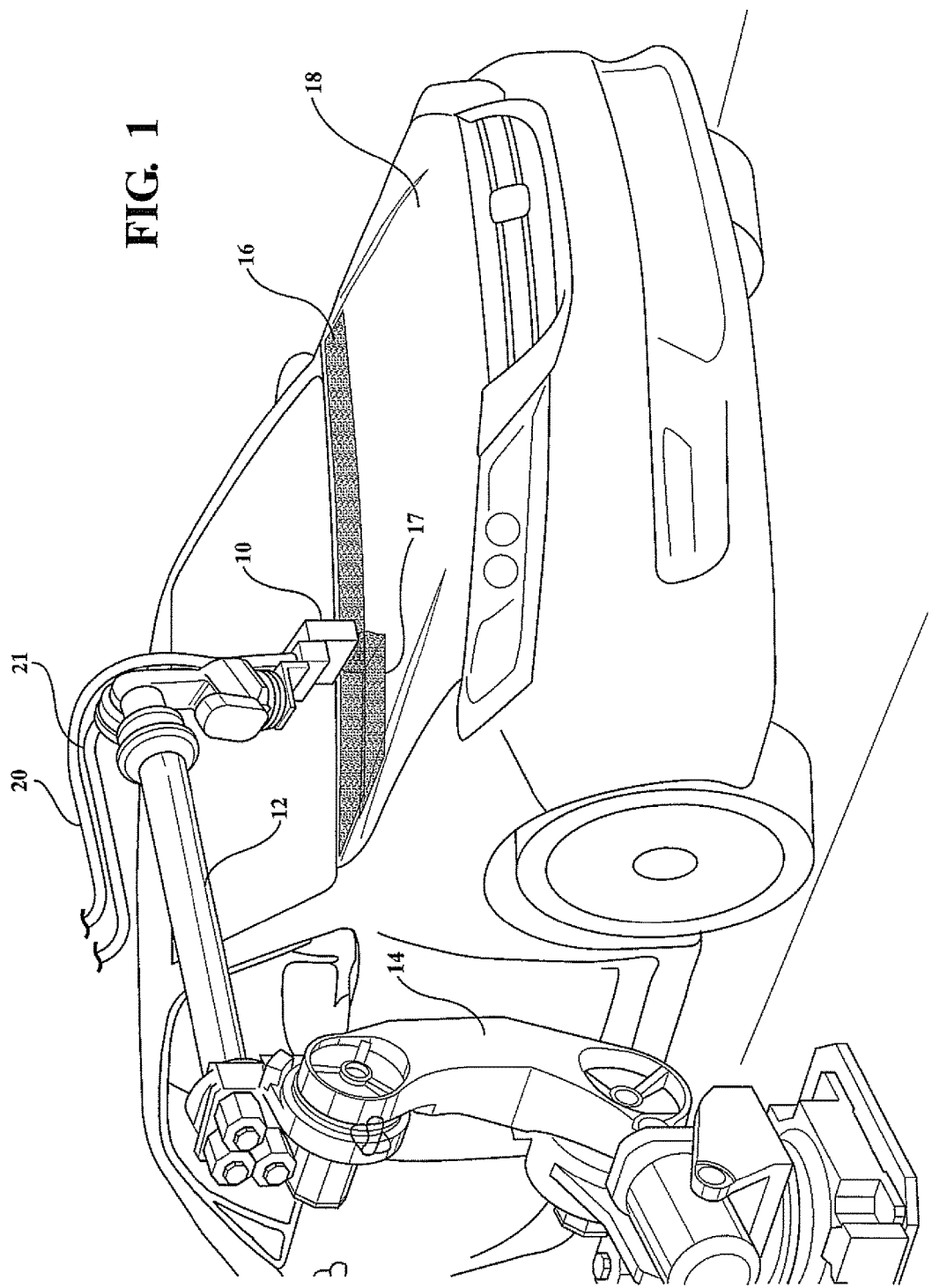
FIG. 1 is a perspective view of an applicator die as described herein mounted on a robot arm and used to apply a protective film to the hood of an automobile.

Referring to FIG. 1, an applicator die 10 is shown mounted on the end of an arm 12 of a numerically controlled multi-axis robot 14 capable of moving the applicator die in three-dimensional space as well as rotating the applicator die about multiple axes. The robot itself is conventional. The applicator die 10 is shown engaged in a process of applying 80 mm wide ribbons 16, 17 of polymeric film to the hood of an automotive vehicle which has been painted and essentially fully assembled, ready for shipment to dealer. In FIG. 1, a first ribbon 16 has been applied across the rearmost portion of the hood 18; i.e., the portion closest to the windshield of the automobile, by moving the robot from right to left along a slightly curved path as shown in FIG. 1. The robot then indexed the arm 12 toward the front of the vehicle and is shown in the process of applying a second ribbon 17 moving from left to right across the hood 18 as seen in FIG. 1. Each ribbon is approximately 80 mm wide, is of slightly varying thickness from edge to edge and has an overlap with the adjacent ribbon or ribbons of about 1-7 mm. The material being applied is an aqueous solution of polyvinyl acetate (PVA) at a temperature between about 70° and 120° F. and with a viscosity of about 12,000 centipoise. Material is supplied to applicator die 10 under close temperature and flow rate control via supply conduit 20; temperature-controlled liquid is supplied via conduit 21. The rate of flow of material from the applicator can, for example, be as much as about 2000 mm/second and the robot 14 moves the applicator die 10 relative to the surface of the hood 18 at about that same rate. The spacing between the material outlet of the applicator die 10 and the surface of the hood 18 is about 15 mm, a spacing that, in the die embodiment hereinafter described, causes the ribbon to contact the target surface at the ribbon's maximum width. The ratio of polymer to water in the applied material in an illustrative case is approximately 50/50 but will vary with the application. These figures are given by way of example. Robot speed, extrusion rate, spacing and emulsion ratios can all vary according to need. The ribbon velocity may, for example, be less than half the robot speed or double the robot speed.

Figure 2:
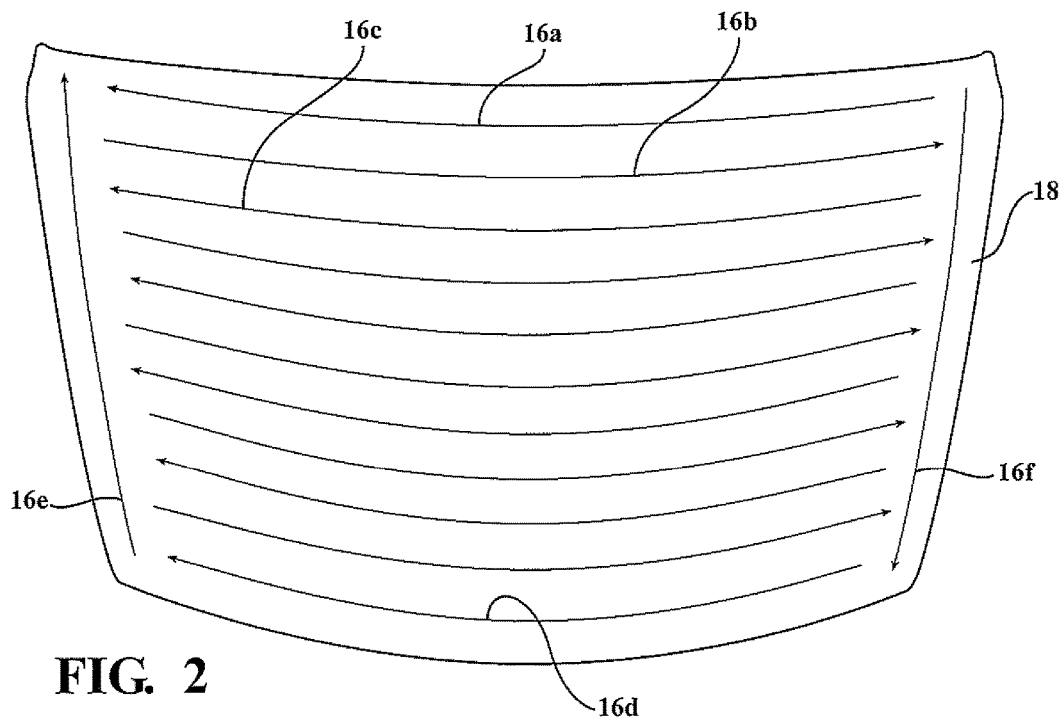
FIG. 2 is a schematic view of a representative pattern of runs of the robotically moved applicator die in fully covering an automobile hood.
Figure 3:
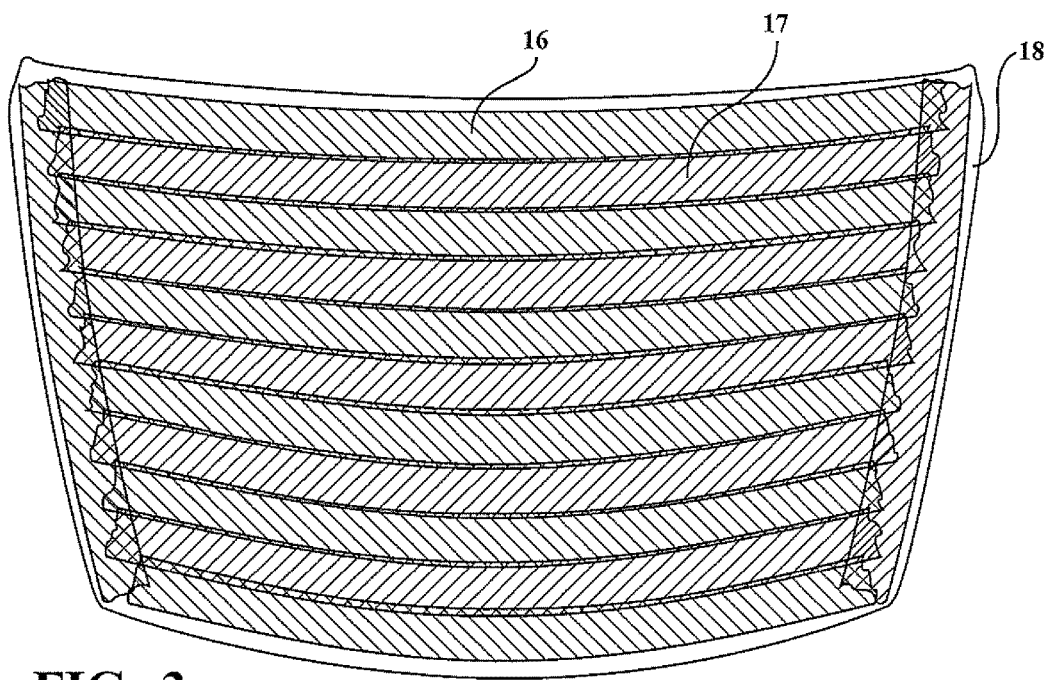
FIG. 3 is a plan view of the ribbons laid down by the run pattern of FIG. 2.

Referring now to FIGS. 2 and 3, the complete coverage of the hood 18 is achieved using crosswise movements to produce ribbons 16a, 16b, 16c and 16d in a back-and-forth fashion, the robot serving to index the applicator forward by just less than the width of the applied ribbon but without the need to rotate the applicator die 10 through 180° as the applicator die 10 is entirely ambidextrous; i.e., it has no "forward" side and operates in a spatial orientation completely orthogonal to the surface upon which material is being applied or it may not be deemed important to cover the starting and finishing edges of the parallel overlapping ribbons.

As shown in FIGS. 2 and 3, the material is applied to the surface of the hood in back-and-forth, overlapping ribbons until the forward-most ribbon 16d is applied at which time the applicator is rotated 90° and moved along the ribbon 16e to cover the left edge of the hood and the lateral ribbon ends, as shown in FIG. 2. The applicator is then moved to the top right portion of the hood, as shown in FIG. 3 to apply the final ribbon 16f. It will be noted that material is not applied across vehicle body seams. The pattern of ribbons in FIGS. 2 and 3 is illustrative only.

Figure 5:
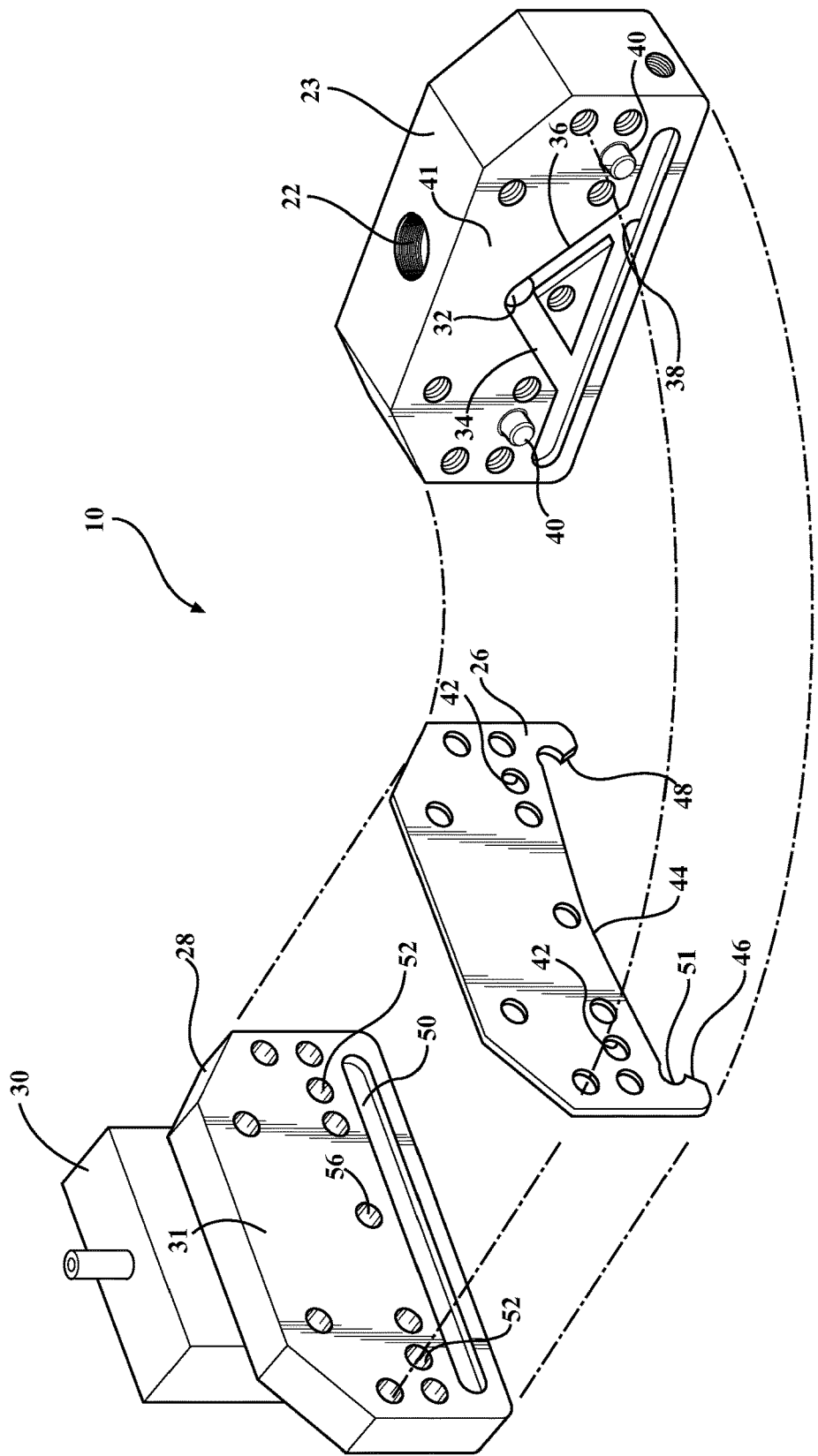
FIG. 5 is an exploded view of an applicator as described in the following specification.
Figure 6:
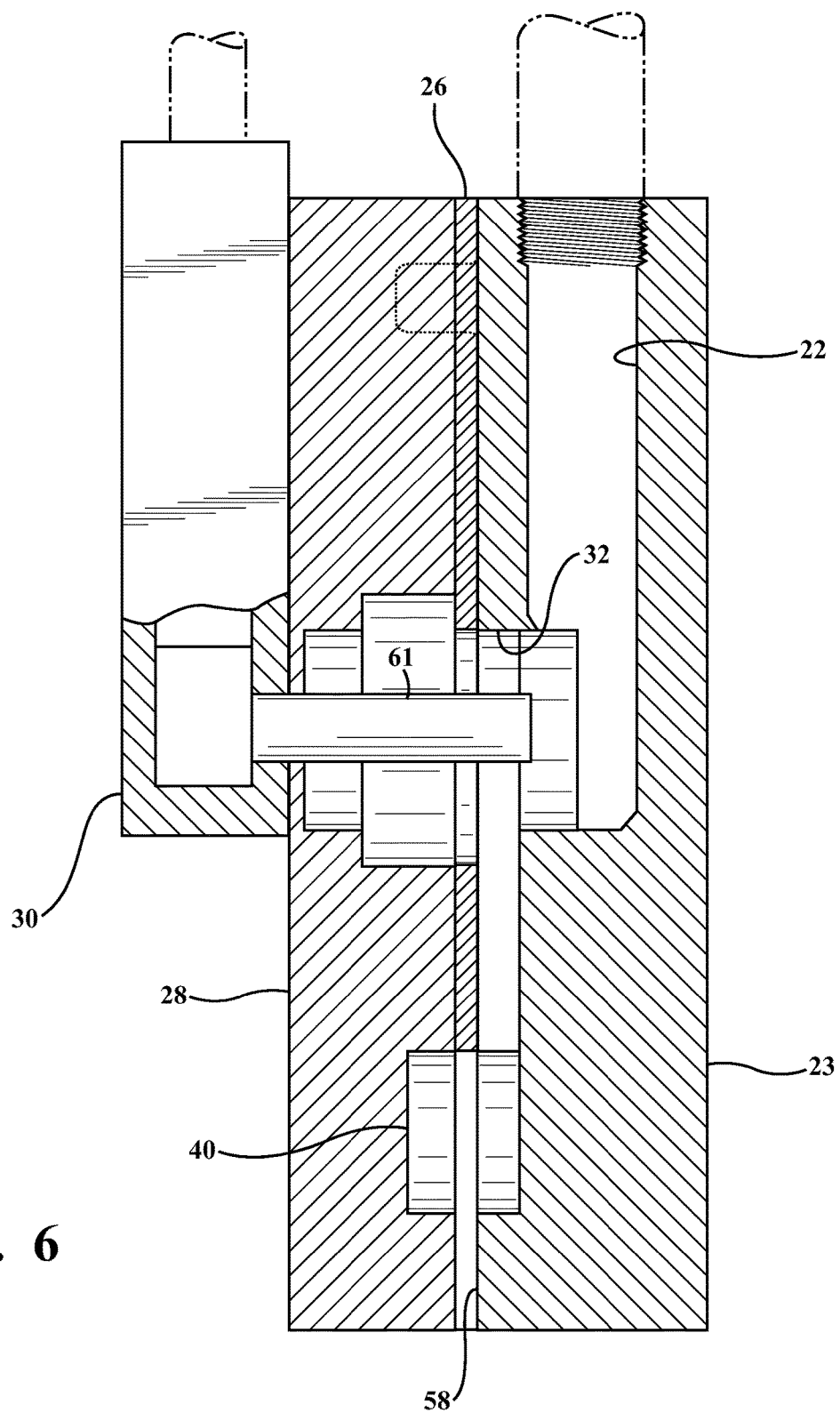
FIG. 6 is a sectional view through the application of FIG. 4.

Looking now to FIGS. 5 and 6, the applicator die 10 is referred to as the "applicator die" because the ribbons issued from it are essentially hydraulically laminarized as opposed to atomized or aerated to create a "spray" of particles or droplets. The term "hydraulic extrusion" is used herein to mean a laminarized flow or non-atomized fluid propelled by hydraulic pressure rather than by air or other compressible propellant. There are no droplets or spray characteristics in the flow. The applicator die 10 is shown to comprise blocks 23 and 28 which are machined out of solid stainless steel, about 3½" long by 2" high with bottom rounded corners and mitered top corners for weight reduction. Between the two blocks 23 and 28 in the assembled condition is a shim or metal spacer 26 made of a softer material such as brass, having locator holes 42 so that it may be precisely located on guide pins 40 which are inserted into precisely located holes in the interior surface 41 of the block 23. Holes 52 in block 28 also receive pins 40. The fourth major element of the applicator die combination is a valve 30 which helps to produce sharper cutoffs as hereinafter explained.

Block 23 is shown to include a threaded material entry port 22 which extends downwardly to approximately in the center of the block where is communicates with a forwardly directed passage 32 which, in turn, feeds material into a gallery of shallow machined grooves comprising diverging legs 34, 36 and a horizontal cross-leg 38, all of which are of the same depth. A horizontal groove 50 is formed in the inside surface 31 of block 28 in full registry with groove 38 in block 23. The spacer 26 fits flush against the inside surface 41 of the block 23 to cover most of the legs 34 and 36 of the gallery; the shim has a lower cutout 44 with slightly flared legs 46, 48 to provide a gap between the inside surfaces 41, 31 of blocks 20 and 28 of uniform thickness for material to flow downwardly from the horizontal grooves 38 and 50 and out through the bottom outlet 58 of the applicator, as shown in FIG. 5. The flaring of the outlet edges 46, 48 and the rounded corners 51 produce a ribbon 53 shown in FIG. 6 which diverges or broadens immediately after exiting the applicator die 10, but then converges in on itself as a result of surface tension. As shown in FIG. 6, this combination of phenomenon increases the usable distance between the outlet of applicator die 10 and the target surface. The ribbon preferably meets the target surface at its point of greatest width.

Block 28 has locator holes 52 which receive the guide pins 40 and locate the block relative to the face 42 of the opposing block 23, as well as the hidden face of the spacer 26. Block 28 has a single horizontal groove 50 which is opposite but co-extensive with the groove 38 within the cutout 44 of the spacer 26 to allow the horizontal fluid chamber created by the two grooves 38, 50 to fill with the PVA material while preventing lateral outflow as well as upflow between the spacer and the inside surface 41 of the block 23. An aperture 56 cooperates with the valve 30 to pull the pin 61 out of the flow chamber when cutoff is desired. This rapidly increases chamber volume and correspondingly reduces chamber pressure, resulting in a slight negative pressure with material pull-back, giving rise to a cleaner cutoff.

When applied to a painted surface for protective reasons, the material applied is polyvinyl acetate in an emulsion containing, in one example, about 50% water and 50% polymer. When dispensed, the material is emitted from the applicator die 10 at a width of about 80 mm; i.e., slightly wider than the width of the grooves 38, 50. This is due to the fact that the material fans out slightly. Thereafter, it has been found that the material begins to converge due to surface tension. Accordingly, the spacing between the outlet 58 of the applicator die 10 and the surface upon which the ribbons are being applied is preferably held such that the material is applied at or near the point of maximum-width; see FIG. 7.

As indicated above, the applicator die 10 can be moved at the selected rate over the target surfaces while material is dispersed or extruded therefrom. This gives rise to a short drying time in view of the fact that the thickness of the overlap area is not double that of the overall thickness of the ribbon. When placed in an infrared oven, drying time of about 15 minutes has been shown to be possible at a temperature of 180°. Convective drying can also be used.

Figure 7:
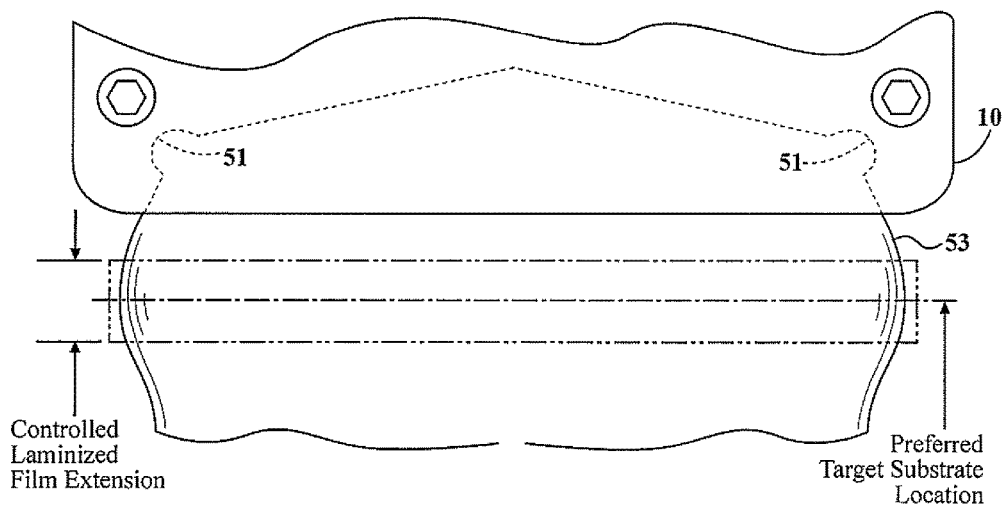
FIG. 7 is a diagram of a material ribbon emerging from the applicator die showing how it converges but allows substantial latitude in the distance from die outlet to target surface.

It will be noted that the applicator die 10 is operated in a position which is orthogonal to the target surface rather than angled or tipped in the direction of flow as is the case with typical spray-type, deflective applicators. It will also be noted that the extruded ribbon of material being applied is not particled or atomized; rather, it is a full, continuous ribbon of material moving outwardly and downwardly in laminar form and at a desired rate. Because the applicator is ambidextrous, it does not have to be turned around by rotation between parallel passes in opposite directions and this too, increases the rate at which an automobile body part, for example, a hood, can be covered. After coating, the component goes to an oven for faster curing. FIG. 7 shows how the film behaves as it leaves the applicator die 10. Because of the diverging shape of the die exit slot, the ribbon diverges at 53 and then converges due to surface tension. The die-to-target spacing is preferably such as to apply the ribbon to the target surface at the point of maximum ribbon width.

Figure 8:
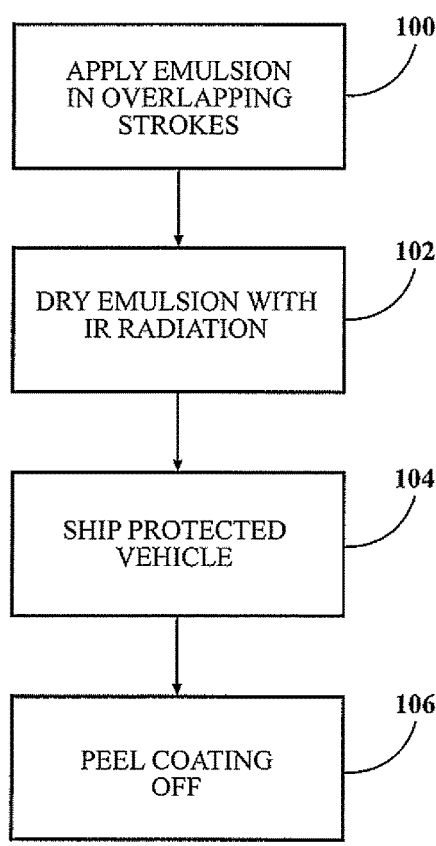
FIG. 8 is a block diagram of one of the methods described herein.

FIG. 8 is a schematic diagram of a method of applying a protective film of an automobile. The first step 100 as indicated by the legend is to apply the emulsion in overlapping and alternating strokes. The second step 102 is to dry the emulsion with infrared radiation. The third step 104, in the case of a manufactured automobile, is to ship the protected vehicle and the final step 106, typically performed by the dealer, is to peel the coating off of the vehicle and dispose of it in an environmentally appropriate fashion. It peels in one piece and the material can be recycled.

Figure 4:
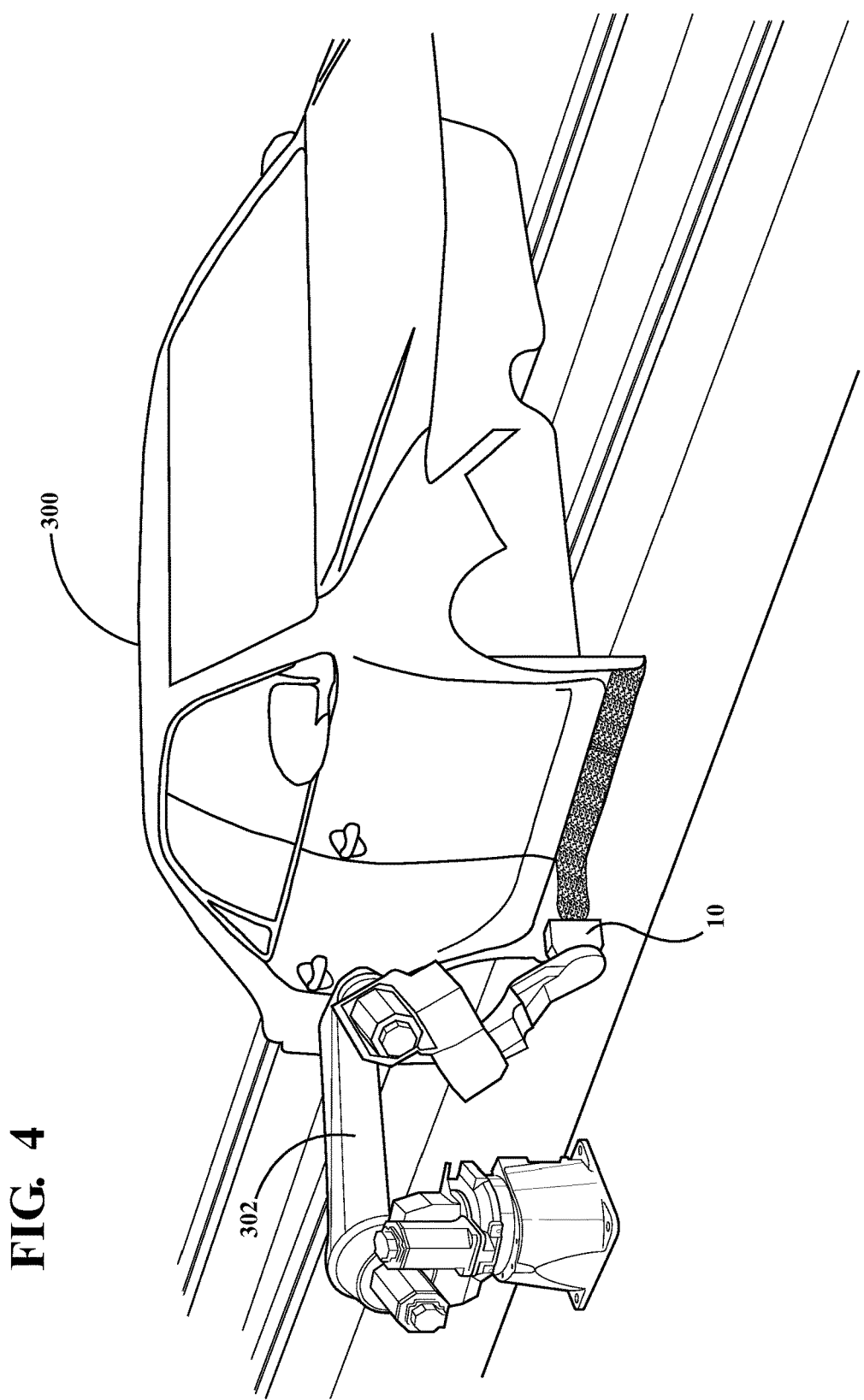
FIG. 4 is a perspective view of another application of the teachings herein as applied to the use of permanent protective films on rocker panels.
Figure 9:
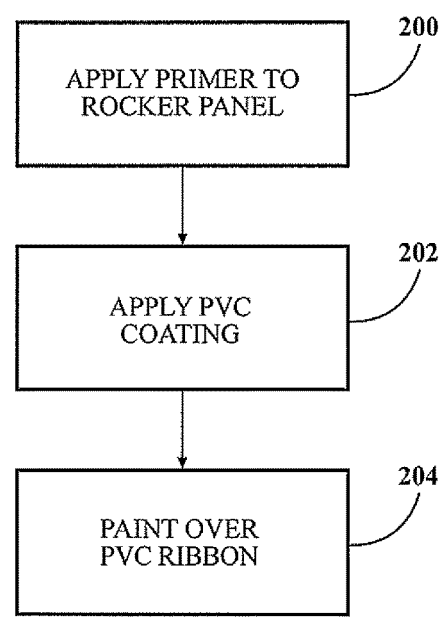
FIG. 9 is a block diagram of another method.

An alternative or additional method of using the applicator die 10 is shown in FIGS. 4 and 9. This method comprises a first step 200 of applying primer to a rocker panel of an automotive body 300 in conventional fashion. Thereafter, a robot 302 carrying an applicator die 10 essentially as shown in FIGS. 5 and 6 and described above is used in step 202 to apply a PVC emulsion to the primed rocker panel as an anti-chip coating. It will be understood that the applicator die 10 has material and coolant supply lines running to it as is the case for the film applicator in FIG. 1. In this case, the polyvinyl chloride solution or emulsion comprises a polymer in an organic solvent applied in a ribbon of the appropriate thickness while the rocker panel is essentially vertical. Temperatures, spacing and application rates are empirically determined in view of the fact that the material has a viscosity of about 50,000 centipoise. It has been found that additional body color paint can be applied over the PVC ribbon in step 204 before it is dried; i.e., paint can be applied "wet-on-wet." The PVC surface produced by the applicator is glossy and uniform in thickness. In this embodiment, only one pass along the rocker panel is required.

There are numerous advantages to the use of this process for the anti-chip coating relative to the prior art process of spraying the coating on the car. Spraying requires the entire vehicle to be masked to protect it against overspray which is highly detrimental to paint finishes. Therefore, this method eliminates the need to mask the vehicle and to remove and dispose of the masking materials. In addition, the laminarized ribbon offers a smooth, glossy appearance as compared to the rough appearance caused by spraying.

Figure 10:
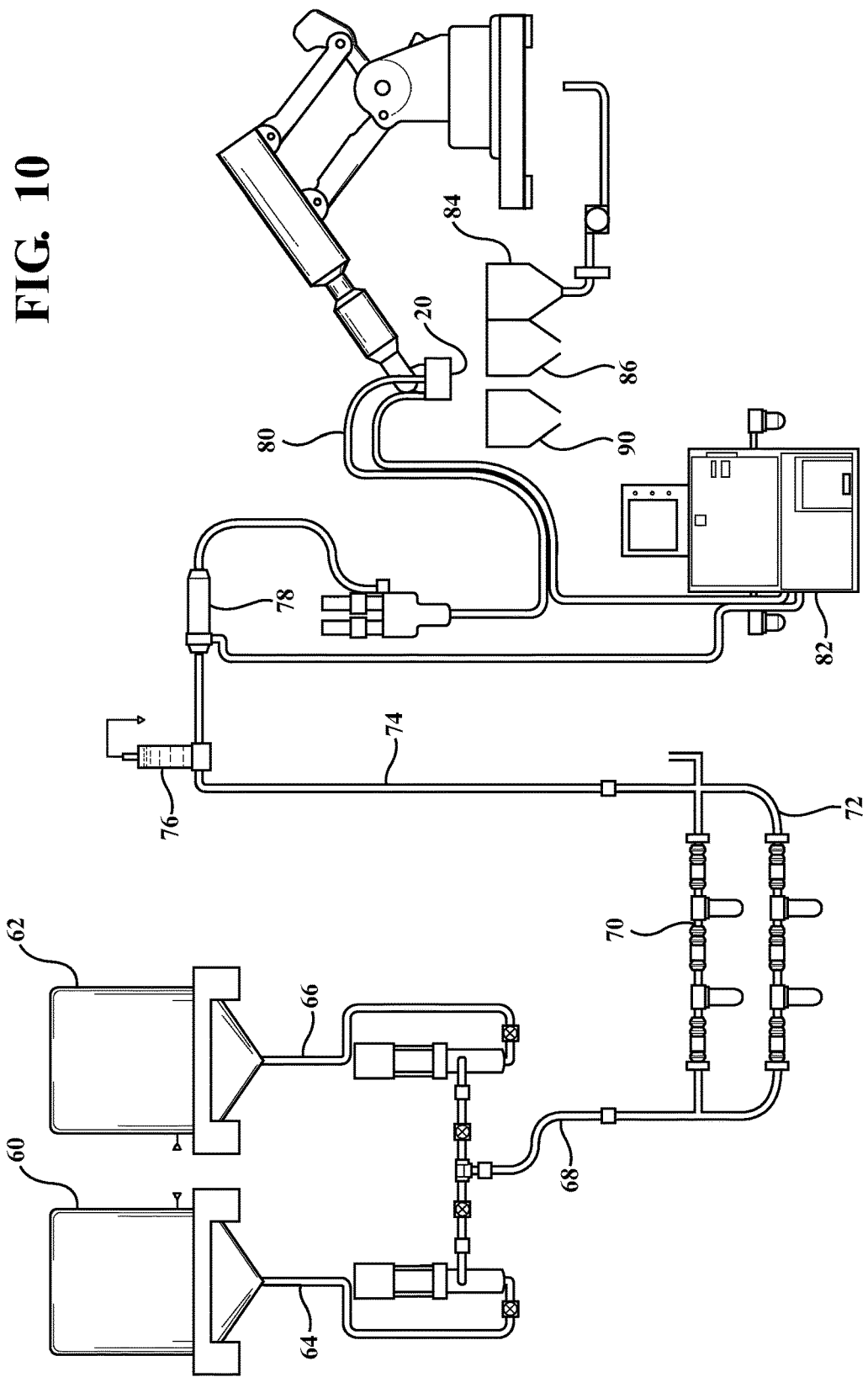
FIG. 10 is a schematic diagram of a complete system.

FIG. 10 is a schematic diagram of a representative system, in this case, for the application of the PVA film as a protective coating. However, the essentials of the system are the same for all applications. As shown in the drawing, material is supplied from drums 60, 62 through lines 64 and 66 which are connected into a Y conduit 68 and from there through parallel legs 70, 72 with drains. Conduit 74 flows from the leg 72 through a filter 76 and from there into a heat exchanger 78 which is controlled by a temperature controller 82. Finally, the material flows into the conduits 80 which supply the applicator die 10. Adjacent the applicator die 10 in a standby position is a liquid-filled cleaning standby station 84 with an interior brush which can be activated as necessary. The fluid in the case of the aqueous PVA emulsion is water. Next to the cleaning standby station 84 is a cleaning station 86 where the applicator can be blow-dried. A purge station 90 may be used where desired.

Summarizing, the applicator die 10 uniquely dispenses a ribbon of material of uniform thickness at a high rate of speed and with improved edge control. PVA in a water emulsion is used in the protective film application process of FIG. 8. PVC in an organic emulsion is used for the anti-chip coating. The two examples demonstrate that the film ribbons can be applied to horizontal as well as vertical surfaces. They can also be applied to inverted and curved surfaces.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of creating a uniform, peelable, protective film of polymeric material on an automobile body panel surface including the steps of:
   a. supplying a homogeneous liquidic solution of a polymer in a solvent to an inlet of an extrusion die having an inner flow path from said inlet to an outlet slot having a uniform width dimension smaller than the length dimension, a stabilizing gallery volume adjacent but spaced upstream of said outlet slot and parallel to said outlet slot of substantially the same length as said outlet slot, said slot having an outwardly flared edge configuration that steers the edges of the extruded solution laterally outwardly, said solution having a viscosity between about 7,000 and 12,000 centipoise;
   b. hydraulically extruding said solution in undivided non-atomized, uncured condition through said die to emit a fluidic, homogeneous ribbon of said solution from said slot with a width of about 80 mm and at a predetermined speed which ribbon is of uniform edge-to-edge consistency and thickness but which divergingly increases in edge to edge dimension after passing through the outlet slot for a known distance from said slot at which distance it stops diverging as a result of surface tension;
   c. placing the die outlet slot substantially at said known distance relative to said panel surface with the direction of fluidic ribbon emission substantially normal to the panel surface so that the extruded uncured fluidic ribbon adheredly contacts the panel surface at a point of maximum ribbon width without crossing a gap between said panel surface and any adjacent panel surface; and
   d. moving the die relative to said panel surface at a speed of about 1500 to 2000 mm/sec and at least approximately equal to the speed at which the ribbon is extruded through the die thereby to apply an uncured ribbon of uniform edge-to-edge thickness and consistency to said panel surface.

2. The method as set forth in claim 1 wherein said material is applied as a solution of polyvinyl acetate said method further including the step of curing the ribbon to solid homogeneous form.

3. The method as set forth claim 1 wherein the die is caused to move in alternating directions without rotation of the die through adjacent but overlapping paths to create adjacent overlapping ribbons.

4. The method defined in claim 1 wherein the gallery is formed by an elongate depression of substantially the same length as the die outlet slot, is parallel to said slot, and has rounded edge surfaces.

5. The method defined in claim 1 wherein the die comprises a pair of mating blocks fastened together with a shim between the block which shim determines the width of said slot and the thickness of the extruded film ribbon.

6. The method defined in claim 1 wherein the die movement is caused by a numerically controlled robot.

7. A method of creating a uniform, anti-chip film of polymeric material on a body panel surface including the steps of:
   a. supplying a homogeneous liquidic solution of a polymer in a solvent to an inlet of an extrusion die having an inner flow path from said inlet to an outlet slot having a length dimension capable of producing a ribbon of about 80 mm in width and with a uniform width dimension smaller than the length dimension, a stabilizing gallery volume adjacent but spaced upstream of said outlet slot and parallel to said outlet slot of substantially the same length as said outlet slot, said slot having an outwardly flared edge configuration that steers the edges of the extruded solution laterally outwardly, said solution having a viscosity of about 30,000 centipoise;
   b. hydraulically extruding said solution in undivided non-atomized, uncured condition through said die to emit a fluidic, homogeneous ribbon of said solution from said slot at a speed of between about 1500 to 2000 mm/sec which ribbon is of uniform edge-to-edge consistency and thickness but which divergingly increases in edge to edge dimension after passing through the outlet slot for a known distance from said slot at which distance it stops diverging as a result of surface tension;
   c. placing the die outlet slot at said known distance relative to a substantially vertically oriented body panel surface with the direction of fluidic ribbon emission normal to the panel surface so that the entirety of the extruded uncured fluidic ribbon adheredly contacts the panel surface at a point of maximum ribbon width without crossing a gap between said panel surface and any adjacent panel surface; and
   d. causing the die to move relative to the panel surface at a speed that corresponds substantially to the speed at which said uncured ribbon emerges from said slot.

8. The method defined in claim 7 wherein said material has a viscosity of about 30,000 centipoise and is applied in a single ribbon as an overcoat to a primed surface for anti-chip protection.

9. The method defined in claim 7 wherein the applied ribbon is thereafter color coated.

10. The method defined in claim 7 wherein said material is polyvinyl chloride in an organic solvent.

* * * * *